(12) United States Patent
Cox et al.

(10) Patent No.: US 8,010,094 B2
(45) Date of Patent: Aug. 30, 2011

(54) MOBILE DEVICE WITH THEMED MULTIMEDIA EFFECTS

(75) Inventors: Ross Cox, Atlanta, GA (US); Randall Lee Coston, Atlanta, GA (US); Eric Wayne Breier, Atlanta, GA (US); Christine Elizabeth Bielinski, Atlanta, GA (US); Kimberly Jo Roth-Beaudot, Atlanta, GA (US); Win S. Gowland, Avondale Estates, GA (US); Stephen Neal Griffin, Atlanta, GA (US); Paul Nicholas Condolora, Atlanta, GA (US); Molly Anne Chase, Atlanta, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 746 days.

(21) Appl. No.: 11/447,659

(22) Filed: Jun. 6, 2006

(65) Prior Publication Data

US 2007/0281750 A1 Dec. 6, 2007

(51) Int. Cl.
*H04M 3/00* (2006.01)
*H04B 1/38* (2006.01)
(52) U.S. Cl. .................... 455/418; 455/566; 455/567
(58) Field of Classification Search .................. 455/567, 455/418–420, 412.2, 414.1, 414.2, 415, 422.1, 455/566, 556.2, 569.1, 573
See application file for complete search history.

(56) References Cited

U.S. PATENT DOCUMENTS

| | | | |
|---|---|---|---|
| 5,682,469 A | 10/1997 | Linnett et al. | |
| 5,880,731 A | 3/1999 | Liles et al. | |
| 5,983,190 A | 11/1999 | Trower, II et al. | |
| 6,021,403 A | 2/2000 | Horvitz et al. | |
| 6,025,841 A | 2/2000 | Finkelstein et al. | |
| 6,233,570 B1 | 5/2001 | Horvitz et al. | |
| 6,260,035 B1 | 7/2001 | Horvitz et al. | |
| 6,308,086 B1 | 10/2001 | Yoshino | |
| 6,366,791 B1 | 4/2002 | Lin et al. | |
| 6,418,330 B1 * | 7/2002 | Lee | 455/567 |
| 6,460,029 B1 | 10/2002 | Fries et al. | |
| 6,501,967 B1 | 12/2002 | Makela et al. | |
| 6,509,913 B2 * | 1/2003 | Martin et al. | 715/762 |
| 6,553,222 B1 * | 4/2003 | Weiss | 455/415 |
| 6,603,985 B1 | 8/2003 | Ichihashi | |

(Continued)

FOREIGN PATENT DOCUMENTS

EP 1 406 216 A2 4/2004

(Continued)

OTHER PUBLICATIONS

Mobile Multimedia Services, Harmer with publish date Jul. 2003, Springer Netherlands, vol. 21 No. 3 pp. 169-180.*

(Continued)

*Primary Examiner* — Brandon J Miller
(74) *Attorney, Agent, or Firm* — Kilpatrick Townsend & Stockton LLP

(57) ABSTRACT

Embodiments of the present invention comprise systems and methods for providing mobile devices having themed multimedia effects. One embodiment comprises a method in receiving a plurality of multimedia effects associated with a theme at a mobile device, receiving mobile device information comprising call log information, power source level, and signal strength associated with a wireless connection between the mobile device and a second device, detecting a mobile device event associated with the mobile device, determining a multimedia effect correlated with the mobile device event based at least in part on the mobile device information and the theme, and outputting the multimedia effect.

20 Claims, 4 Drawing Sheets

U.S. PATENT DOCUMENTS

| | | | |
|---|---|---|---|
| 6,657,643 B1 | 12/2003 | Horvitz et al. | |
| 6,718,186 B2 | 4/2004 | Aoki | |
| 6,901,139 B2 | 5/2005 | Gonzalez et al. | |
| 6,909,878 B2 | 6/2005 | Haller et al. | |
| 6,928,306 B2 | 8/2005 | Matsuda et al. | |
| 6,944,277 B1 | 9/2005 | Viikki | |
| 7,019,749 B2 | 3/2006 | Guo et al. | |
| 7,069,003 B2* | 6/2006 | Lehikoinen et al. | 455/414.2 |
| 7,103,585 B2 | 9/2006 | Jowell et al. | |
| 7,136,482 B2* | 11/2006 | Wille | 379/373.02 |
| 7,359,688 B2* | 4/2008 | Seo et al. | 455/218 |
| 7,519,720 B2 | 4/2009 | Fishman et al. | |
| 7,697,960 B2* | 4/2010 | Seo et al. | 455/566 |
| 2001/0046853 A1 | 11/2001 | Aoyama et al. | |
| 2001/0051536 A1 | 12/2001 | Muramatsu | |
| 2002/0103935 A1 | 8/2002 | Fishman et al. | |
| 2003/0027604 A1* | 2/2003 | Hayashi | 455/567 |
| 2003/0027605 A1* | 2/2003 | Hijii | 455/567 |
| 2004/0067751 A1 | 4/2004 | Vandermeijden et al. | |
| 2004/0091093 A1 | 5/2004 | Bookstaff | |
| 2004/0204146 A1 | 10/2004 | Deeds | |
| 2004/0253993 A1 | 12/2004 | Nakamura | |
| 2005/0036603 A1 | 2/2005 | Hughes | |
| 2005/0059433 A1* | 3/2005 | Nagao | 455/566 |
| 2005/0107075 A1 | 5/2005 | Snyder | |
| 2005/0107128 A1 | 5/2005 | Deeds | |
| 2005/0119033 A1 | 6/2005 | Fan et al. | |
| 2005/0140519 A1 | 6/2005 | Smith | |
| 2005/0143108 A1* | 6/2005 | Seo et al. | 455/466 |
| 2005/0164746 A1 | 7/2005 | Boyd | |
| 2005/0180554 A1 | 8/2005 | Alston et al. | |
| 2005/0207556 A1 | 9/2005 | Gonzalez et al. | |
| 2006/0003742 A1 | 1/2006 | Seligmann et al. | |
| 2006/0003743 A1 | 1/2006 | Moody et al. | |
| 2006/0003813 A1 | 1/2006 | Seligmann et al. | |
| 2006/0003814 A1 | 1/2006 | Moody et al. | |
| 2006/0046699 A1* | 3/2006 | Guyot et al. | 455/414.1 |
| 2006/0079325 A1* | 4/2006 | Trajkovic et al. | 463/31 |
| 2006/0084413 A1* | 4/2006 | Myoung | 455/412.1 |
| 2007/0072648 A1* | 3/2007 | Stoops | 455/566 |
| 2007/0207782 A1* | 9/2007 | Tran | 455/414.1 |

FOREIGN PATENT DOCUMENTS

| | | | |
|---|---|---|---|
| WO | WO 01/62018 A2 | 8/2001 | |

OTHER PUBLICATIONS

Mobile Phones for Next Generation: Device Design for Teenager, Berg et. al., CHI 2003, Apr. 5-10, 2003, ACM pp. 433-440.*

International Search Report in related Application No. PCT/US2007/012690 dated Dec. 11, 2007.

USENET posting "T720 Voice Ringtone" http://groups.google.com/group/alt.cellular.verizon/msg/5b16f581408a632a?dmode=source&hl=en (Feb. 9, 2003).

Useful papers for designing autonomous humanlike conversational avatars . . . pp. 1-8 http://ww.cs.bham.ac.uk/~1xz/links.htm (Nov. 3, 2006).

Egges, et al., 'A model for personality and emotion simulation,' MIRALab—University of Geneva, pp. 1-8 http://www.miralab.unige.ch/papers/162.pdf (date unknown).

Stern, 'Creating Emotional Relationships With Virtual Characters,' *Emotions in Humans and Artifacts*, Editors, R. Trappl, P. Petta, and S. Payr, MIT Press, Apr. 2003, pp. 1-16 http://www.interactivestory.net/papers/stern_emotionartifacts1999.html.

"fivetunes", one page http:/www/five.tv/accessibility/programmes/fivetunes (Nov. 3, 2006).

"Degrassi-Boards Forums—What's your cellphone ringer?" http://www.degrassi-boards.com/showthread.php?t=2670&page=2 (Aug. 14, 2004) http://www.degrassi-boards.com/archive/index.php/f-14/t-2670.

"SmartProfiles for Nokia Series 60 by Symbianware" Handango—Symbian OS™ Products, pp. 1-5 (Aug. 8, 2004) http://developer.handango.com/PlatformProductDetail.jsp?siteId=1&osId=331&jid=1E69EA54514X9XAX1CDX45E6272E43B1&platformId=4&productType=2&catalog=0&:sectionId=0&productId=62619.

"Smart Caller Ring Tunes", one page http://ring.smart.com.ph/smart/homeAction do (Nov. 3, 2006).

"Verizon Wireless offers real music ringback tones", pp. 1 and 25 http://www.mobiletechnews.com/info/2004/11/17/120451.html (Nov. 17, 2004).

"Office Assistant," Wikipedia, the free encyclopedia, http://en.wikipedia.org/wiki/Office_Assistant, 1 page, (last modified Jan. 30, 2005), accessed page as of Jan. 31, 2005 from archive.org at http://web.archive.org/web/20050131014134/http://en.wikipedia.org/wiki/Office_Assistant.

* cited by examiner

MOBILE DEVICE WITH THEMED MULTIMEDIA EFFECTS

FIELD OF THE INVENTION

The field of the invention relates to telecommunication systems and devices, and specifically to a system that alerts a user upon the happening of an event based on indicators associated with a theme.

BACKGROUND

Mobile devices, such as cellular telephones, generally receive and transmit information such a voice and data to and from a base station. The mobile device may include a ring tone or vibration capability to indicate an incoming call or data. The ring tone generally includes an audio alert to notify the user that the mobile device is receiving an incoming call. The audio alert may include intermittent beeps or a series of tones with varying pitches, tempos, or other audio characteristics to form a tune. A mobile device may also include a vibrating alert. A vibrating alert is useful when the mobile device is in a noisy environment or where the ring tone noise might disturb others. Additionally, the vibrating alert is useful for users who are hearing impaired. Generally, mobile devices with a vibrating function have a motor connected to an unbalanced weight that vibrates or shakes the device to alert the user when an incoming call is received. Other alerts that may be associated with a mobile device include audio files, games, images, video, and lighting patterns.

A user, generally, chooses the type of alert and certain characteristics of the alert, such as the volume or vibrate. In some mobile devices, a pick-list may be selected by the user that includes one or more complimentary multi-media effects. Complimentary multi-media effects include audio files, ring tones, vibrator patterns, games, images, video sequences, and lighting patterns. In some conventional mobile devices, a user may associate a pick-list with a pre-determined event. Events include incoming calls, e-mail messages, text messages, voice messages, time, alarms, or pages. For each event occurrence, a multi-media effect from the associated pick-list is selected and played. Upon the subsequent occurrence of the same event, a different multi-media effect is selected from the associated pick-list, thereby providing the user with a variety of effects.

The different multi-media effects, however, do not have similar traits, features, or a common aspect between the multi-media effects. Consequently, the pick-list lacks multi-media effects that, individually or in a group, produce a caricature-like effect when events occur. Furthermore, a typical conventional mobile device does not monitor for a variety of changes related to the mobile phone. Generally, the only detected events are call log information and user-set alarms. The multi-media effect is selected randomly from a user created pick-list and does not specifically relate to the particular event being detected.

In other mobile devices, a ring tone is selected by a network device and sent to a mobile device with properties such as tempo, volume, pitch, and rhythm based on information from a call log. For example, a faster ring tone may be selected and played for each successive message or call sent to a particular person on the same day or a ring tone with a louder volume when a previous call from the caller was missed by the mobile device user. Selecting ring tone properties based on call log information, however, does not monitor and select ring tones based on other events that may be associated with the mobile device. Furthermore, the ring tones are played with different characteristics and are not thematically related with common characteristics and do not provide a mobile device with personality traits developed by ring tones.

Accordingly, a need exists for a mobile device system and method that selects and plays multimedia effects based on a variety of mobile device events where the notifications are related with common characteristics thereby creating a mobile device with a personality and bringing the mobile device "to life." A need also exists for a mobile device system and method whereby the multimedia effects available to be selected are dynamically changed without input from the mobile device user.

SUMMARY OF THE INVENTION

Embodiments of the present invention comprise mobile communications systems and methods that provide a mobile device with a variety multimedia effects that are thematically related and are output upon the occurrence of a mobile phone event. In one embodiment, a plurality of multimedia effects associated with a theme are received at a mobile device. Mobile device information, including call log information, power source level, and signal strength of the mobile device is received. A mobile device event associated with the mobile device is detected. A multimedia effect correlated with the mobile device event is determined based at least in part on the mobile device information and the theme. The determined multimedia effect is output.

In another embodiment of the present invention, data and information related to a plurality of multimedia effects having components associated with a theme and a mobile device event are stored. Mobile device information is received at a server. At least one multimedia effect is selected based at least in part on mobile device information. The at least one multimedia effect is sent to the mobile device.

Another embodiment of the present invention includes a server having a processor and a memory. The memory is configured to store data and information related to a plurality of multimedia effects associated with a theme. The processor is configured to electronically transmit the multimedia effects to a mobile device. A mobile device is configured to receive the multimedia effects. The mobile device having a memory for storing the data and information, a multimedia effects engine for detecting a mobile device event, and a processor for accessing the stored multimedia effect correlated to the mobile device event. The processor is configured to output the multimedia effect. The mobile device event comprises at least one of call log information, power source level, and signal strength associated with a wireless connection between the mobile device and a second device.

BRIEF DESCRIPTION OF THE DRAWINGS

These and other features, aspects, and advantages of the present invention are better understood when the following Detailed Description is read with reference to the accompanying drawings.

DETAILED DESCRIPTION

Figure 1:
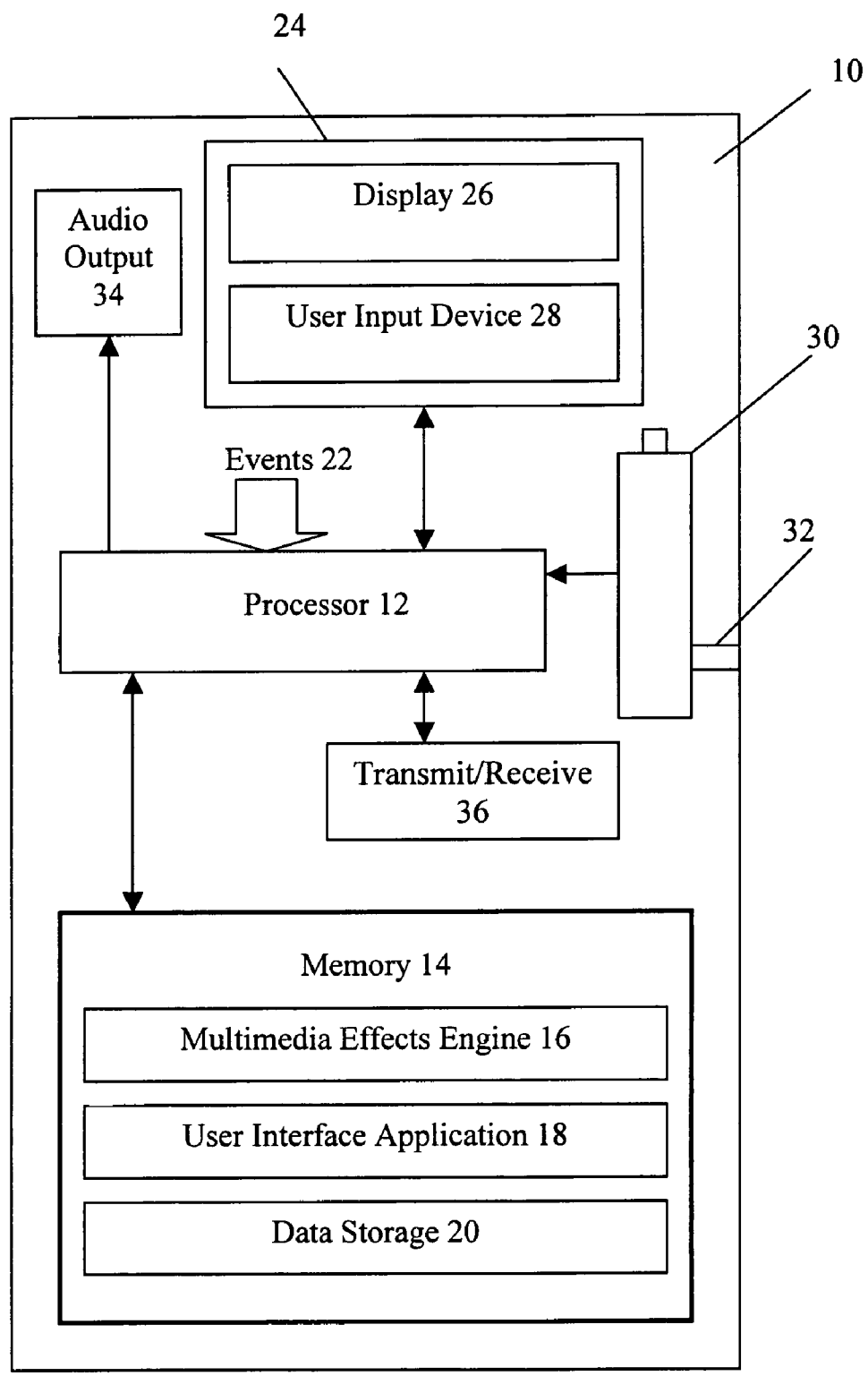
FIG. 1 is a general block diagram of one embodiment of a mobile device.

Embodiments of the present invention comprise mobile devices, such as cellular phones, personal digital assistants (PDAs), Blackberry, or other types of devices for wirelessly receiving and/or transmitting voice and data, that include a variety of multimedia effects associated with a theme output upon the occurrence of mobile device events. Examples of themed multimedia effects include displayed images, video, or lighting, mobile device vibrations, audio outputs, or "ringback tones" all associated with a common theme, such as a character. Ringback tones are generally the audio the caller hears when they call a mobile device user that continues until the mobile device user answers the call, the user's voicemail greeting is played, or until the caller disconnects before either one of the previous two events occur. The themed multimedia effects may be generated upon the occurrence of a variety of mobile phone events, resulting in entertaining indications of events associated with the mobile device. Examples of mobile phone events include call log information, power source or battery level, signal strength, and power source charge status. The multimedia effects may be associated with mobile device events manually, such as by a mobile device user, or dynamically by connecting the mobile device to a network.

When the themed multimedia effects are associated with a character, the mobile device appears to have the persona of the character. For instance, the audio outputs may include musical tones and/or words in the voice of a character. The displayed images, video, or lighting may include colors and images associated with the character speaking the audio. The mobile device vibrations may include vibration rhythms or intensities associated with a character. In some embodiments of the present invention, a different multimedia effect may be played for each ring of an incoming call. The present invention provides an intelligent output system utilizing themes and creating a rich user experience. For example, the mobile device may output the following multimedia effects upon the occurrence of associated mobile device events.

(a) First ring of an incoming call: "Hey, your phone is ringing." The audio having a voice associated with a cartoon character.
 (b) Second ring of an incoming call: "Are you going to answer that? I said your phone is ringing." The audio having a voice associated with a cartoon character.
 (c) Missed call: "Way to go, ducked another one." The audio having a voice associated with a cartoon character.
 (d) Incoming call from a frequent caller: "Not them again, haven't you had enough?" The audio having a voice associated with a cartoon character and displaying an image of the cartoon character with a distressed look.
 (e) Low battery or other power source level: "I'm about out of juice, how about a pick-me-up?" The audio having a voice associated with a cartoon character and displaying an image of the cartoon character with a tired expression.
 (f) After connecting the battery or other power source to a recharging power source: "Ah, now go fix me a sandwich." The audio having a voice associated with a cartoon character and displaying an image of the cartoon character with a happy expression.

In some embodiments of the present invention, the mobile device multimedia effects may be dynamically and/or automatically updated with multimedia effects associated with the theme already included in the mobile device but having different properties. A server may be provided in communication with the mobile device through a network and a base station. The server receives multimedia effects updates and the associated multimedia events from the base station. The server automatically updates the multimedia effects of the mobile device by sending the multimedia effects associated with mobile device events obtained from the base station to the mobile device.

In other embodiments of the present invention, the themed multimedia effects are located in the phone but are not integrated with the phone system. The multimedia effects are associated with mobile device events and a multimedia effects engine outputs the multimedia effects when the associated event occurs.

In other embodiments of the present invention, a user security layer between the server and the mobile device is provided. For example, a ghost account associated with the mobile device user's account may be created to prevent providers of themed multimedia effects from obtaining the mobile device user account and personal information.

Referring now to FIG. 1, a block diagram of a mobile device 10 adapted to include multimedia effects associated with a theme and particular mobile device events according to one embodiment of the present invention is shown. The mobile device 10 may be any type of wireless communications device such as a cellular phone, PDA, or Blackberry and comprise a processor 12 in communication with a computer-readable medium, such as a memory 14, having a multimedia effects engine 16, a user interface application 18, and mobile device data storage 20. The multimedia effects engine 16 may be computer-readable code capable of being executed by the processor, such as a software program, that is in communication, through the processor 12, with a plurality of other mobile device components and adapted to detect the occurrence of mobile device events 22, store correlation data between the mobile device events and multimedia effects, and cause the output multimedia effects.

The user interface application 18 may be in communication with the multimedia effects engine 16 and user interface components 24. The user interface components 24 may include a display 26 and user input means 28, such as a keypad. The user interface application 18 can output a user interface to the display 26 and a user can interact with the mobile device 10 via the user input device 28. In some embodiments of the present invention, and discussed in more detail below, the user interface application 18 receives inputs from the user input means 28, communicates the inputs to the multimedia effects engine 16 through the processor 12, receives a command to output a particular multimedia effect from the multimedia effects engine 16 through the processor 12, and outputs the multimedia effect to the display 26 through the processor 12. The user interface application 18 may also communicate other information and data, such as call log data, to the display 26 through the processor 12.

The mobile device data storage 20 may include call log information or other device data. The multimedia effects engine 16 and/or the user interface application 18 may communicate with the mobile device data storage 20 through the processor 12 to obtain stored data related to the mobile device.

The mobile device 10 also includes a power source 30 for providing power to the other components of the mobile device and a power source port 32 for providing access to the power source 30 from outside the mobile device 10. In some embodiments of the present invention, the power source 30 is a rechargeable battery that is periodically recharged with a recharging device accessing the power source 30 through the power source port 32.

In addition, the mobile device 10 includes a transmitter/receiver 36 for communicating wirelessly with a communications network. For example, the transmitter/receiver 36 may receive voice calls, short message service (SMS) messages, and multimedia effects. The transmitter/receiver 36 may also transmit data from the mobile device 10. For example, the transmitter/receiver 36 may transmit voice signals, SMS messages, and data and information from mobile device components to the communications network. In some embodiments, the transmitter/receiver 36 may transmit and receive data simultaneously.

The mobile device events 22 may include incoming calls, call length, identification of the caller, power source or battery level and charging status, presence and number of voicemail messages, and the number of calls in a pre-determined time period to and from individual callers. In some embodiments of the present invention, the multimedia effects engine 16 detects the occurrence of a mobile device event 22 and determines the multimedia effect that is correlated with the detected mobile device event 22 and outputs the correlated multimedia effect to the appropriate mobile device component. For example, if the correlated multimedia effect involves an image and audio, the multimedia effects engine 16 utilizes the user interface application 18 to output the images to the display 26 and the audio to a speaker 34.

The multimedia effects stored in memory 14 of mobile device 10 may be dynamically and/or automatically updated with additional or a second set of multimedia effects stored in a server. The additional or second set of multimedia effects may be associated with the same theme as the themed multimedia effects already stored in memory 14 of the mobile device 10. Furthermore, the additional or second set of multimedia effects may replace the themed multimedia effects stored in the mobile device memory 14.

Figure 2:
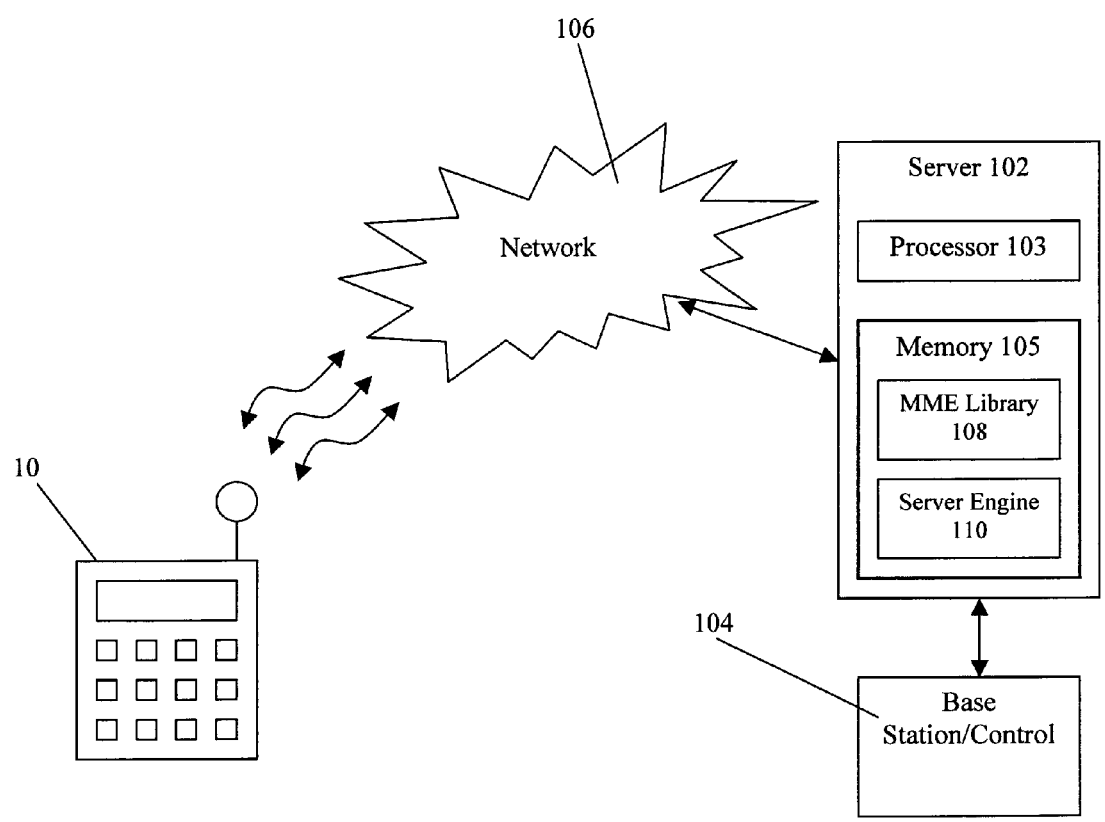
FIG. 2 illustrates one embodiment of the communication of a mobile device with a base station through a network and a server.

As illustrated in FIG. 2, some embodiments of the mobile device 10 communicate with a server 102 and a base station/control 104 through a network 106. The network 106 may be any type of network that is configured to communicate data between two or more devices. For example, the network 106 may include a wireless communications terminal that communicates wirelessly with the mobile device and wirelessly or through wires to a public switched phone network, wide area network, local area network, or otherwise, that is connected to the server 102. The network 106 may also communicate with the mobile device 10 over wires and may include several types of networks that interconnect and communicate between the server 102 and mobile device 10. For example, the mobile device 10 may be connected to a computer system via a universal serial bus (USB) port, or otherwise, and the computer system may be connected to a local area network (LAN), wide area network (WAN), public switched telephone network (PSTN), or otherwise. The LAN, WAN, PSTN, or otherwise, may communicate directly to the server 102 or through additional networks.

The server 102 is in communication with the network 106 and includes a processor 103 and a memory 105 with a multimedia library 108 for storing multimedia effects and a server engine 110, such as computer readable software, for causing the server 102 to communicate with the mobile device 10 and base/control station 104. The server 102 is in communication with the base station/control 104 that transmits multimedia effects to be stored in the multimedia library 108 and communicates to the server 102 when the multimedia effects should be transmitted to the mobile device 10. For example, the base station/control 104 may be a computer system that uploads files including the multimedia effects and data and information associating the multimedia effects with one or more multimedia events to the server 102 and multimedia library 108. The computer system may also send to the server 102 a command to transmit the stored multimedia effects to the mobile device 10.

Generally, the user selects the themed multimedia effects that will be output by the mobile device 10 and may associate the themed multimedia effects with particular multimedia events. The multimedia effects stored in the mobile device 10 may be dynamically and/or automatically updated by the base station/control 104 through the server 102 and network 106. In other embodiments of the present invention, the mobile device 10 transmits mobile device event data such as call log information, including caller frequency, call lengths, and missed calls, and frequency of power source recharge to the server 102 and base station/control 104 through network 106. Based on the particular mobile device events, the base station/control 104 may direct the server 102 to transmit certain multimedia effects associated with mobile device events to the mobile device 10. Therefore, each mobile device 10 may comprise a particular set of multimedia effects associated with mobile phone events.

In some embodiments of the present invention, the mobile device may store data associated with mobile device events that occurred in memory. The server 102 may receive the stored mobile device event information from the mobile device 10. In one embodiment, the server engine 110 selects one or more multimedia effects based on the stored mobile device event information and sends the one or more multimedia effects to the mobile device 10. In other embodiments, the server engine 110 sends the stored mobile device event information to the base station/control 104 and the base station/control 104 selects one or more multimedia effects and sends the selected multimedia effects to the server 102. The server engine 110 sends the selected multimedia effects to the mobile device 10.

Figure 3:
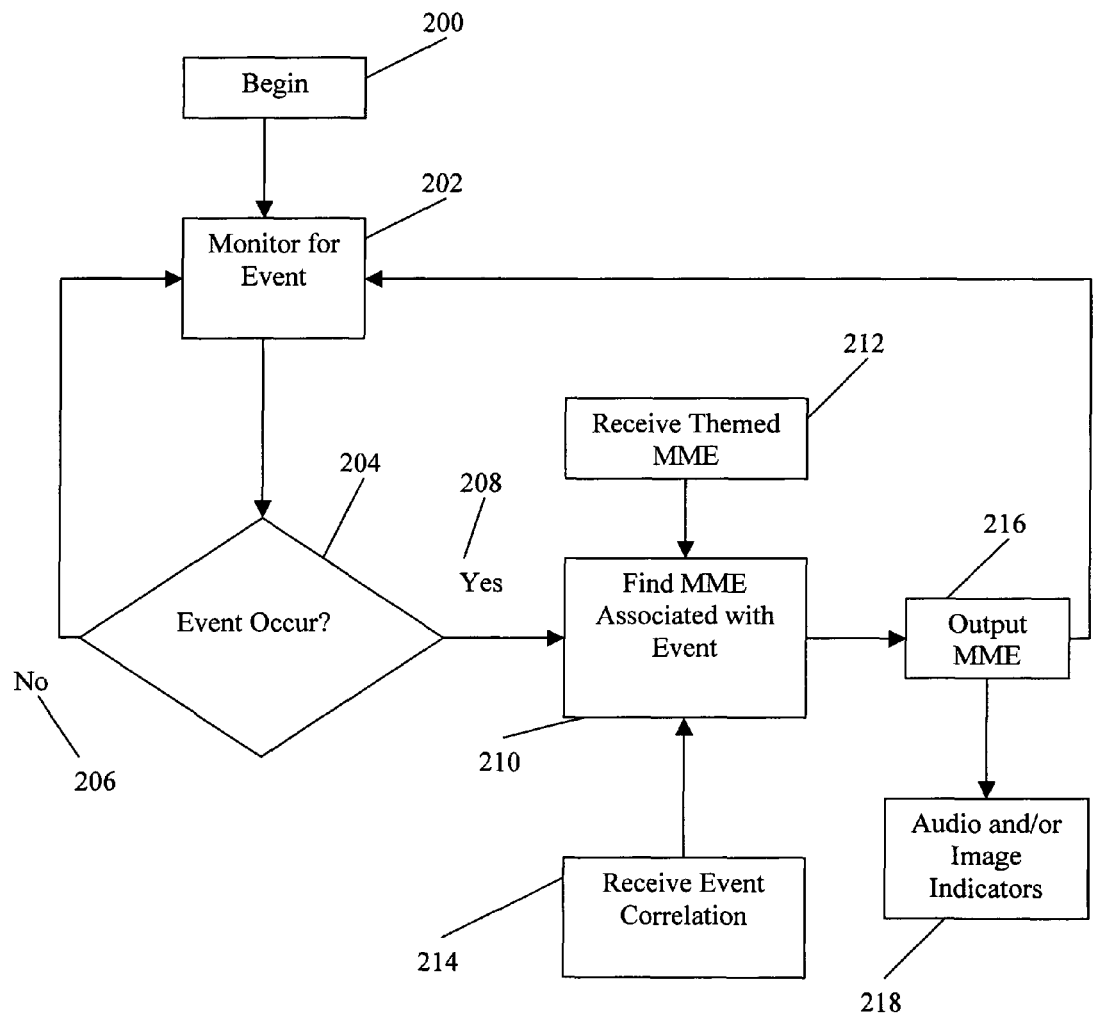
FIG. 3 is a flow diagram of one embodiment of a multimedia effects engine.

Referring now to FIG. 3, illustrated is a flow diagram of a mobile device monitoring for mobile device events and outputting a multimedia event according to one embodiment. The device begins at block 200 with the multimedia effects engine 16 of FIG. 1 monitoring for a mobile phone event 202 by receiving data and information related to the mobile device from other mobile device components. For example, the multimedia effects engine 16 may receive data and information from the stored call log information 20, power source 30, or the presence of an incoming call. Such call log information may include incoming calls, call length, identification of the callers, the number of calls in a pre-determined time period to or from individual callers, incoming text messages, and email messages. Other mobile device events may include power source level, power source charging status, signal strength between the mobile device and a second device such as a cellular tower or other wireless communications station, mobile device location, user-set alarms, time, or any other event that may be associated with the mobile device.

As shown in block 204, the multimedia effects engine 16 determines if an event has occurred. If the multimedia effects engine 16 determines that an event has not occurred 206, the mobile device resumes monitoring for an event 202. If the multimedia effects engine 16 determines that an event has occurred 208, the multimedia effects engine 16 utilizes multimedia effects engine software and stored multimedia effects 16 to select the multimedia effect associated with the event 210. As shown in blocks 212 and 214, the mobile device receives multimedia effects and event correlation data and stores the information and data in the multimedia effects engine 16 of the memory 14. In block 216, once the multimedia effects engine 16, determines the multimedia effect associated with the event, the multimedia effects engine 16 causes the output of the multimedia effect. In block 218, the multimedia effect may be audio and/or image indicators with a theme 218. In some embodiments of the present invention, the multimedia effects may also include video, vibrations, or any other type of effect that provides the user with an indication that an event is occurring and is associated with a theme. After outputting the multimedia effect 216, the mobile device resumes monitoring for a mobile device event 202.

Figure 4:
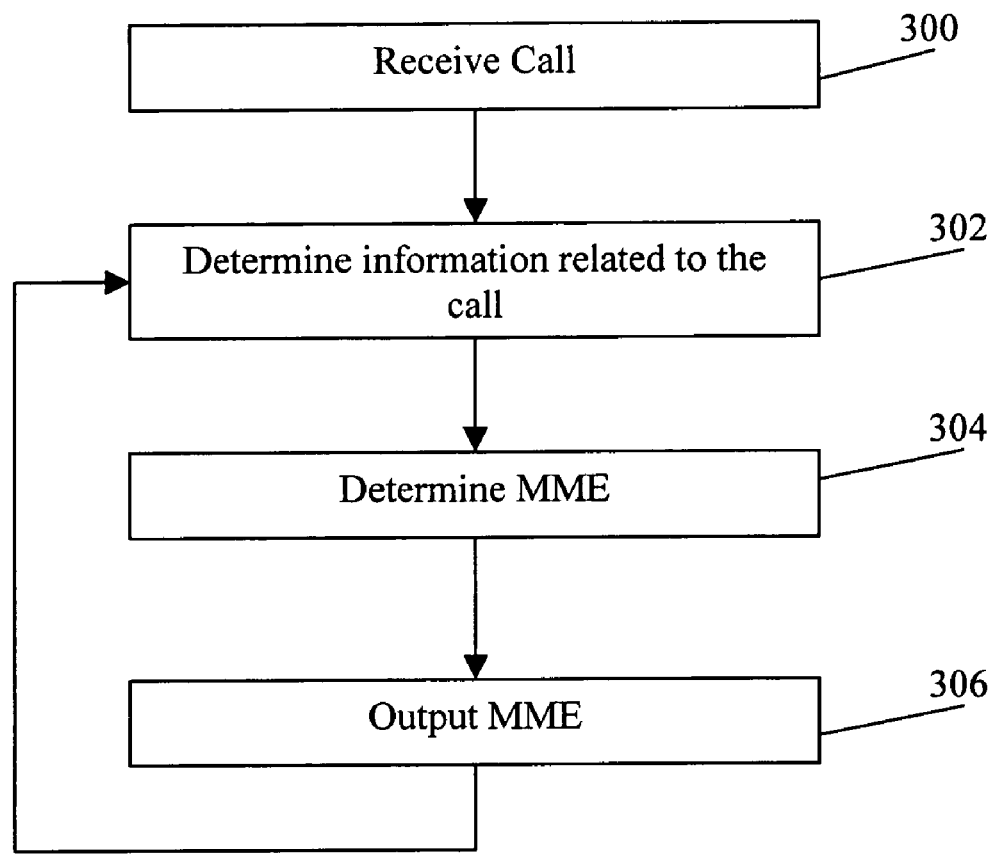
FIG. 4 is a flow diagram of providing a different multimedia effect for each incoming call ring.

FIG. 4 depicts a flow diagram of outputting different multimedia effects for each ring of an incoming call according to one embodiment of the present invention. The mobile device first receives an incoming call at block 300. Information related to the call is then determined at block 302 by the multimedia effects engine 16. Information related to the call may include the ring number, caller identification, caller frequency, last received call from the caller, or any other information associated with the call. The multimedia effects engine 16 determines the multimedia effect associated with the event and related call information 304. The mobile device outputs the determined multimedia effect 306 and the multimedia effects engine 16 determines the information related to call 302 to check if any information has changed, such as the ring number. For example, if the multimedia effects engine 16 detects a second ring is necessary, the multimedia effects engine 16 determines the multimedia effect associated with the event and related call information at block 304. In some embodiments of the present invention, the associated multimedia effect for each ring is different. In one embodiment, all the multimedia effects for the rings are associated with the same theme.

The following are examples of a mobile device having multimedia effects associated with a theme and mobile device events according to particular embodiments of the present invention.

A base station/control computer system uploads multimedia effect data and data associating each multimedia effect with one mobile device event to a server. In one example, the themed multimedia effects include images, sounds, and phrases associated with a cartoon character, such as Meatwad™, the lovable shape-shifter from the cartoon Aqua Teen Hunger Force™. The server stores the data in a multimedia effect library. The base station/control computer system sends a command to the server to transmit the data to a mobile device, such as a mobile phone. The server sends the multimedia effects and data to a mobile phone wirelessly through a network. The mobile phone includes a multimedia effects engine software capable of detecting mobile phone events, determining the multimedia effect associated with the detected event, and outputting the determined multimedia effect.

The following are examples of multimedia effects associated with the character Meatwad that the multimedia effects engine 16 causes the output of effects upon the occurrence of the associated mobile phone event.

(a) First ring of an incoming call: "Hey, your phone is ringing." The audio having a voice associated with Meatwad.

(b) Second ring of an incoming call: "Are you going to answer that? I said your phone is ringing." The audio having a voice associated with Meatwad.

(c) Fifth ring of an incoming call: "You aren't too good for them. Just pick it up." The audio having a voice associated with Meatwad.

(d) Missed call: "Way to go, ducked another one." The audio having a voice associated with Meatwad.

(e) Incoming call from a frequent caller: "Oh no . . . not them again, haven't you had enough?" The audio having a voice associated with Meatwad and displaying an image of Meatwad with a distressed expression.

(f) Incoming call from a number not in the phone's call log: "I say take a message on this one." The audio having a voice associated with Meatwad.

(g) Disconnect from call that lasted more than thirty minutes: "You talk too much. I need a rest." The audio having a voice associated with Meatwad and displaying an image of Meatwad with a perturbed expression.

(h) Incoming call on Christmas Day: "Don't be a scrooge. Wish them Merry Christmas or at least Happy Holidays." The audio having a voice associated with Meatwad and displaying an image of Meatwad in a holiday costume.

(i) Low battery: "I'm about out of juice, how about a pick-me-up?" The audio having a voice associated with Meatwad and displaying an image of Meatwad with a tired expression.

(j) After connecting the battery for recharging: "Ah, now go fix me a sandwich." The audio having a voice associated with Meatwad and displaying an image of Meatwad with a happy expression.

(k) Low signal strength: "Move! I'm having a hard time hitting the tower." The audio having a voice associated with Meatwad.

A mobile device having themed multimedia effects as in the present invention results in a mobile device taking on the persona of a character. Furthermore, the multimedia effects may be automatically updated, thereby providing an entertaining device with lifelike characteristics and outputs that change periodically.

Aspects of the present invention may include the ability to detect mobile phone events other than call log information and output an appropriate multimedia effect upon the occurrence of those events. Mobile devices experience many changes in conditions and a mobile device that outputs a response to those changes results in an entertaining device that has a persona of the character associated with the theme.

Other aspects of the present invention may include the ability to output a separate multimedia effect for each ring of an incoming call.

The foregoing description of embodiments of the invention has been presented only for the purpose of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated.

That which is claimed:

1. A method comprising:
receiving a plurality of multimedia effects at a mobile device, wherein the plurality of multimedia effects are associated with a theme by the plurality of multimedia effects being related to characteristics of a character and by the characteristics embodying the theme;
dynamically updating the plurality of multimedia effects by:
automatically receiving a second plurality of multimedia effects associated with the theme, each of the second plurality of mobile multimedia effects being correlated with a mobile device event automatically through mobile device information; and
automatically replacing the plurality of multimedia effects at the mobile device with the second plurality of multimedia effects, the second plurality of multimedia effects being associated with the theme;
detecting mobile device information at the mobile device, wherein the mobile device information comprises call log information, power source level, and signal strength associated with a wireless connection between the mobile device and a second device;
monitoring the mobile device information to detect an occurrence of at least one mobile device event at the mobile device;
automatically determining at least one of the second plurality of multimedia effects is correlated with the at least one mobile device event; and
outputting the at least one of the second plurality of multimedia effects determined to be correlated with the at least one mobile device event to cause the mobile device to simulate part of a personality of the character.

2. The method of claim 1, wherein the at least one mobile device event is an incoming call, wherein information associated with the at least one mobile device event comprises at least one of an identification of the incoming call, call length, identification of the callers, battery level, charging status, and a number of calls in a pre-determined time period to or from individual callers.

3. The method of claim 1, wherein outputting the at least one of the second plurality of multimedia effects comprises outputting the at least one of the second plurality of multimedia effects to an output device, the output device comprising at least one of a user interface and a speaker.

4. The method of claim 1, further comprising monitoring only the call log information for the occurrence of mobile device events.

5. The method of claim 1, wherein the mobile device event is an incoming call having a plurality of rings.

6. The method of claim 5, further comprising:
automatically selecting and outputting a first multimedia effect from the second plurality of multimedia effects, the first multimedia effect being associated with the theme and representing a first ring of the plurality of rings; and
automatically selecting and outputting a second multimedia effect from the second plurality of multimedia effects, the second multimedia effect being associated with the theme and representing a second ring of the plurality of rings, wherein the second multimedia effect has different characteristics than the first multimedia effect.

7. The method of claim 1, wherein the second plurality of multimedia effects comprises one or more of image, audio, vibrations, and moving images.

8. The method of claim 1, further comprising receiving a selection of the theme from a user.

9. A method comprising:
storing on a server a plurality of multimedia effects, the plurality of multimedia effects being associated with a theme and at least one mobile device event that occurs at a mobile device, the theme being a character, the plurality of multimedia effects embodying characteristics of the character;
receiving, at the server, mobile device information about the mobile device, the mobile device information comprising information associated with the at least one mobile device event and a plurality of stored multimedia effects on the mobile device;
dynamically selecting at least one multimedia effect from the plurality of multimedia effects based on the at least one mobile device event and the plurality of stored multimedia effects stored on the mobile device; and
transmitting the at least one multimedia effect dynamically selected from the plurality of multimedia effects to the mobile device to cause the at least one multimedia effect to replace at least one stored multimedia effect of the plurality of stored multimedia effects on the mobile device, wherein the stored multimedia effects are capable of being outputted by the mobile device to cause the mobile device to exhibit a persona of the character.

10. The method of claim 9, wherein the information associated the mobile device event comprises at least one of an identification of an incoming call, call length, identification of at least one caller, battery level, charging status, and a number of calls in a pre-determined time period to or from individual callers.

11. The method of claim 9, wherein the server communicates wirelessly with the mobile device.

12. The method of claim 9, wherein the at least one multimedia effect comprises one or more of image, audio, vibrations, and moving images.

13. The method of claim 9, further comprising receiving a selection of the theme from a user.

14. A mobile device comprising:
a non-transitory computer-readable medium having code stored thereon, the code being executable by a processor to:
receive a plurality of multimedia effects, the plurality of multimedia effects being associated with a theme by being related to characteristics of a character and by the characteristics embodying the theme;
dynamically update the plurality of multimedia effects by (i) automatically receiving a second plurality of multimedia effects associated with the theme, each of the second plurality of mobile multimedia effects being correlated with a mobile device event automatically through mobile device information; and (ii) automatically replacing the plurality of multimedia effects at the mobile device with the second plurality of multimedia effects, the second plurality of multimedia effects being associated with the theme;
detect mobile device information comprising call log information, power source level, and signal strength associated with a wireless connection between the mobile device and a second device;
monitor the mobile device information to detect an occurrence of at least one mobile device event at the mobile device; and
automatically determine at least one of the second plurality of multimedia effects is correlated with the at least one mobile device event; and
an output device configured for outputting the at least one of the second plurality of multimedia effects determined to be correlated with the at least one mobile device event to cause the mobile device to simulate part of a personality of the character.

15. The mobile device of claim 14, wherein the output device comprises a display and a speaker.

16. The mobile device of claim 14, wherein the code is further executable by a processor to respond to a mobile device event comprising an incoming call having a plurality of rings by:
automatically selecting a first multimedia effect from the second plurality of multimedia effects, the first multimedia effect being associated with the theme and representing a first ring of the plurality of rings; and automatically selecting a second multimedia effect from the second plurality of multimedia effects, the second multimedia effect being associated with the theme and representing a second ring of the plurality of rings, wherein the second multimedia effect has different characteristics than the first multimedia effect, wherein the output device is configured for outputting the first multimedia effect and the second multimedia effect.

17. The mobile device of claim 14, wherein the at least one mobile device event comprises at least one of an identification of an incoming call, call length, identification of at least one caller, battery level, charging status, or a number of calls in a pre-determined time period to or from individual callers.

18. A server device comprising: a multimedia effects library stored in memory, the multimedia effects library comprising a plurality of multimedia effects associated with a theme and at least one mobile device event that occurs at a mobile device, the theme being a character, the plurality of multimedia effects embodying characteristics of the character; a server engine stored in the memory, the server engine being executable by a processor to: receive mobile device information about the mobile device, the mobile device information comprising information associated with the at least one mobile device event and a plurality of stored multimedia effects on the mobile device; and dynamically select at least one multimedia effect from the plurality of multimedia effects based on the at least one mobile device event and the plurality of stored multimedia effects stored on the mobile device, wherein the server device is configured for transmitting the at least one multimedia effect dynamically selected from the plurality of multimedia effects to the mobile device to cause the at least one multimedia effect to replace at least one stored multimedia effect of the plurality of stored multimedia effects on the mobile device, wherein the stored multimedia effects are capable of being outputted by the mobile device to cause the mobile device to exhibit a persona of the character.

19. The server device of claim 18, wherein the server device is configured to communicate wirelessly with the mobile device.

20. The server device of claim 18, wherein the plurality of multimedia effects comprise an image, audio, a vibration command, and a moving image.

* * * * *